United States Patent [19]

Peleg et al.

[11] Patent Number: 5,031,424
[45] Date of Patent: Jul. 16, 1991

[54] GARMENT BLANK AND BRIEF

[75] Inventors: Eliezer Peleg, New York, N.Y.; Michael J. Bolin, Clover, S.C.

[73] Assignee: Sara Lee Corporation, Winston-Salem, N.C.

[21] Appl. No.: 309,028

[22] Filed: Feb. 7, 1989

[51] Int. Cl.$^5$ .............................................. A41B 9/06
[52] U.S. Cl. ........................................ 66/176; 66/189
[58] Field of Search .................. 66/177, 176, 189, 175

[56] References Cited

U.S. PATENT DOCUMENTS

| | | | |
|---|---|---|---|
| 3,241,340 | 3/1966 | Knohl | 66/177 X |
| 3,310,962 | 3/1967 | Mahler et al. | 66/187 X |
| 3,824,812 | 7/1974 | Matthews et al. | 66/177 |
| 4,010,627 | 3/1977 | Pernick | 66/177 |
| 4,043,156 | 8/1977 | Pernick | 66/177 |
| 4,624,115 | 11/1986 | Safrit et al. | 66/176 |
| 4,682,479 | 7/1987 | Pernick | 66/176 |

FOREIGN PATENT DOCUMENTS 2220150  9/1974  France .................. 66/176

Primary Examiner—Wm. Carter Reynolds

[57] ABSTRACT

A knit garment blank includes a tubular body portion having a first section knit with desired stitches and second sections knit with yarn from selected spaced courses of the first section, for example, such as every fourth course. In each second section, selected spaced courses continuing from the first section are looped through other selected spaced courses. At a given course during knitting, needles knitting the front of the first section and the second sections are pressed off and a plurality of courses appending from the remaining stitches of the course forms a rear panel. A brief is formed by cutting away selected portions of the blank to define leg openings and sewing a crotch piece to the body and the rear panel.

15 Claims, 2 Drawing Sheets

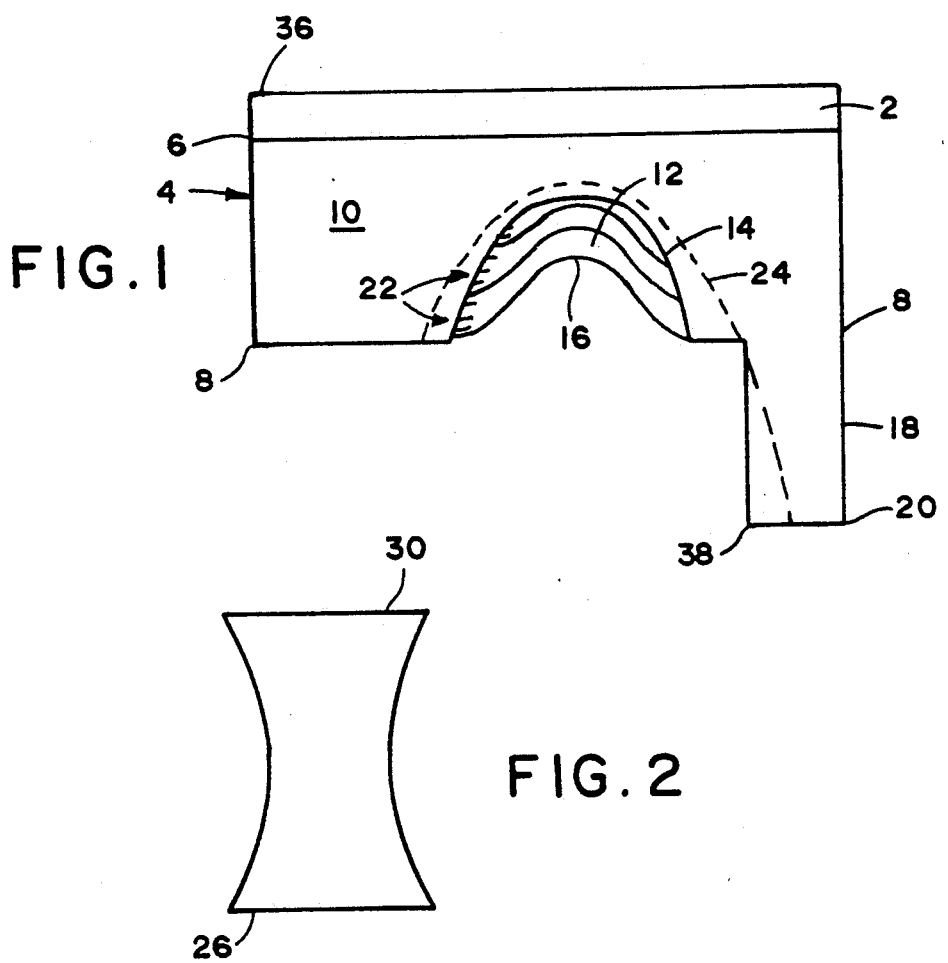
FIG. 1
FIG. 2
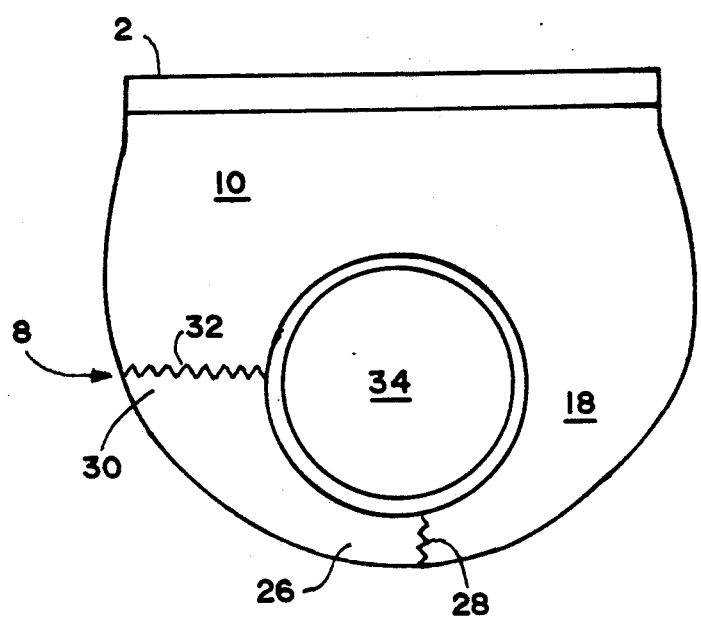
FIG. 3

GARMENT BLANK AND BRIEF

BACKGROUND OF THE INVENTION

Garments such as briefs or panties have been made by knitting a tubular blank on a circular knitting machine and cutting out areas on opposite sides that form leg openings when the front and rear ends of the blank are sewn together. As described in U.S. Pat. No. 4,628,115, guide lines for the cutting operation may be formed in the blank by a distinctive stitch such as a tuck stitch in a jersey knit or by knitting the entire area to be cut out with a distinctive stitch so that the line of demarcation between it and the rest of the blank serves as a cutting guide. It is estimated that this process wastes about 20% of the yarn depending on the particular design of the brief or panty. In the highly competitive garment industry this amount of waste is very significant.

In my patent application bearing the same title as this application and filed concurrently herewith, a blank is described that eliminates much of the waste yarn. A tubular body is knit with 360° courses down to a given course in which a majority of the needles are pressed off and the remaining needles continue to knit so as to form a rear panel for the brief. Notches are cut in either side of the body from the course that is pressed off, and the rear panel is also cut to shape. A brief or panty is made by sewing one end of a crotch piece to the rear panel and sewing the other end to the central portion of the tubular body so as to form leg openings on either side that can be trimmed in any desired manner.

In an application by Michael J. Bolin, entitled: "Garment Blank With Special Disposable Section" that is filed concurrently herewith, a tubular blank is provided with a first section that is to be used in the garment and second sections in the form of notches on opposite sides of the blank that are to be cut out so as to form leg openings when the front and rear ends of the blank between the notches are sewn together. The second sections are knit with yarn from spaced courses to that its area is a fraction of what it would be if it were knit with yarn from all courses, thereby reducing the amount of yarn that is wasted. At the same time, however, the second sections prevent the first section from curling and thereby interfering with cutting along specially provided nearby guidelines and sewing trimming to the edge thus formed.

BRIEF SUMMARY OF THE INVENTION

In accordance with this invention, a first section of a tubular blank is knit with stitches that are desired in the garment, and second sections on either side of the blank are knit with yarn from spaced courses as in the application of Michael J. Bolin referred to. At a given course, the needles knitting the front of the first section and the needles knitting the second sections are pressed off, but the needles for knitting the rear of the first section continue to knit so as to form a rear panel. Cutting guide lines for the upper part of the leg opening are knit into the first section that extend from the pressed off course, around each of the second sections and back to the pressed off course. Cutting guide lines can also be knit in the rear panel. A brief or panty is formed by sewing one end of a crotch piece to the bottom of the rear panel and its other end to the front central part of the first section so as to provide leg openings. Yarn is saved because less yarn is used in the second section than in my application just referred to.

BRIEF DESCRIPTION OF THE DRAWINGS

FIG. 1 is a side view of a garment blank of this invention,

FIG. 2 illustrates a crotch piece;

FIG. 3 shows a brief or panty made with the blank of this invention that is illustrated in FIG. 1 and a crotch piece of FIG. 2.

DETAILED DESCRIPTION OF THE INVENTION

Figure 4:
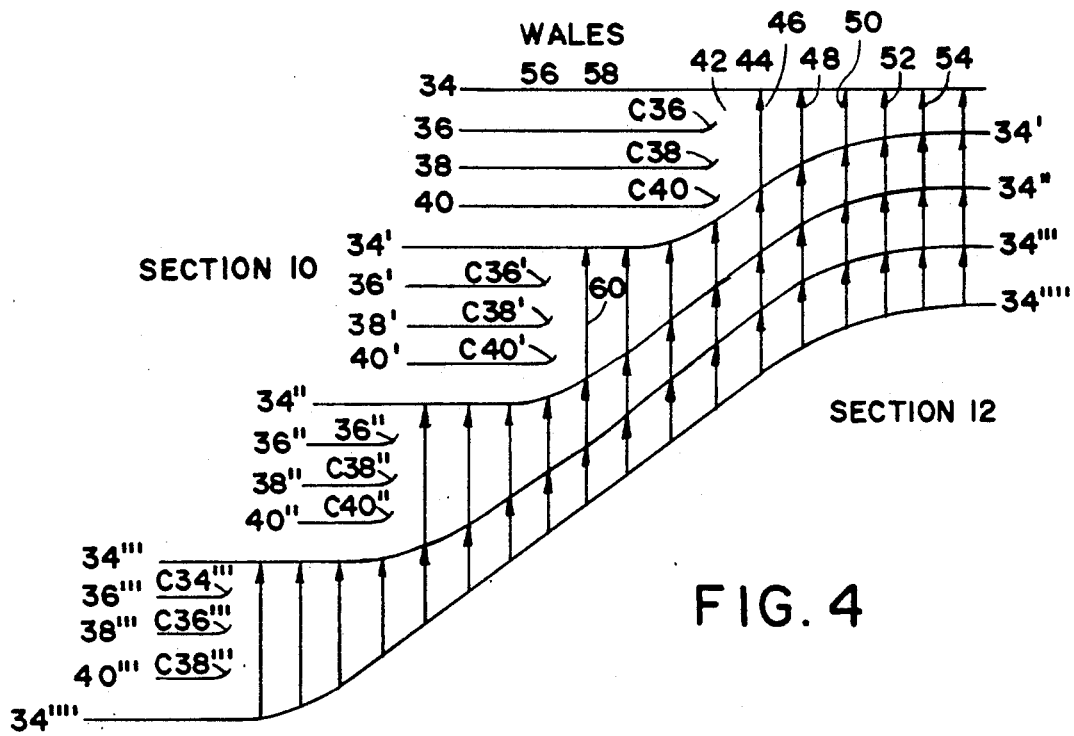
FIG. 4 is a schematic diagram of this stitching for forming sections of the blank that are to be cut out and disposed of, and FIG. 5 shows the actual yarn in a few of the stitches occurring in a transition between first and second sections.

In the side view of a blank of this invention as shown in FIG. 1, a waistband 2 in the form of a transfer or double welt may be knit with elastic material at the top of the blank. This is followed by the knitting of a tubular body 4 between courses 6 and 8 having a first section 10 knit with stitches desired in the garment and a second section 12 lying between lines 14 and 16 that is knit with yarn from spaced courses of the section 10 such as every fourth course as will be described in more detail. The stitches of the first section are knit with yarn in courses connected vertically to adjacent courses. The line 16 shows the course 8 in the section 12. Courses between said spaced courses are simply not knit, and the yarn is cut at one edge of the second section 12. A portion of the course 8 along the bottom of the section 10 and the line 16 of the section 12 is pressed off, and the needles around the rest of the course 8 continue knitting so as to form a rear panel 18 extending down to a course 20. The rear panel 18 is equidistant from the second sections 12, and is generally rectangular in plan.

During the knitting of the courses in between the spaced courses, the needles for the portions of the wales within the section 12 are held in their welt positions, and the yarn is cut as indicated by the short lines 22. This results in a knit fabric that extends one-quarter of the distance between the line 14 and the course 8 at the bottom of the section 10 so as to save 75% of the yarn that would be thrown away if, as in my other application, the entire area between the line 14 and the course 8 were knit with yarn from all of the courses. Other spaced courses could be used so as to save more or less yarn.

In addition to saving yarn, the section 12 prevents the material of the section 10 from curling sufficiently to interfere with the introduction of the blank into a cutting machine so that it cuts along a dashed guide line 24. The portion of the guide line 24 in the section 10 determines the shape of the upper part of a leg opening, and the portion in the rear panel 18 determines the shape of the lower part of the leg opening.

In order to make a brief or panty, one end 26, of a crotch piece shown in FIG. 2 is sewn to the bottom of the rear panel 18 as indicated at 28 in FIG. 3, and its other end 30 is sewn to the front lower portion of the body 10 as indicated at 32 so as to form a leg opening 34. The shape of the upper portion of the leg opening 34 is determined by the portion of the guide line 24 in the section 10 and in the rear panel 18, and the shape of the lower portion is determined by a side of the crotch piece of FIG. 2.

As in my other application, the blank of FIG. 1 saves yarn that would otherwise be used to knit an area between the courses 8 and 20 and between the left wale 36 and the wale 38 at vertical edges of the rear panel 18, but as pointed out above, it also saves a portion of the yarn that would normally be used to form a fully knit fabric in the area between the line 14 and the course 8.

The knitting of the second sections of the tubular knit body with less yarn in such manner as to inhibit curling that would interfere with cutting and sewing along the cutting guide line 24 can be accomplished as follows.

FIG. 4 is a schematic diagram showing what the yarn for every fourth course of the first section 10 is knit to in order to form the second section 12. The second sections are knit with yarn in courses continuing from selected spaced courses of the first section, and each selected spaced course in each of the second sections is looped or stitched through another selected spaced course. No attempt has been made to show the actual positions of certain stitches because that would involve showing puckers that are formed when yarn coming from an earlier knit course is knit to a later knit course. The drawing is further simplified by not indicating the stitches in the section 10 and by indicating the stitches in the section 12 by arrows rather than showing the actual yarn. The ends or floats produced by cutting the yarn for the intermediate courses at points adjacent the section 12 are shown by short upwardly directed diagonal lines. Courses are represented by horizontal lines, wales are represented by vertical lines, and the knitting proceeds in a downward direction.

A course 34 runs from the section 10 across the top of the section 12, and the diagonal lines $C_{36}$, $C_{38}$ and $C_{40}$ show the yarn ends or floats that are produced when the yarns of the successive courses 36, 38 and 40 are cut just after a wale 42. Although not shown, knitting is resumed in the courses 36, 38 and 40 at the other side of the section 12 as each course is knit.

Yarn from the same feeder that supplied the yarn for a course 34' is knit to the course 40 in the usual manner, but the stitches are not indicated by arrows because they are part of the section 10 and not part of the section 12. After the stitch at the wale 42 is completed, yarn from the feeder supplying yarn for the course 34' is knit to the course 34 at a wale 44 as indicated by an arrow 46. From this point successive stitches ar made to the course 34 as indicated by the arrows 48, 50, 52 and 54 so as to finish knitting the top course of the section 12. Note, however, that it is aligned with the course 36 of the section 10.

When the stitch indicated by the arrow 46 is made, the yarn at the wale 42 of the course 34' is drawn toward the intersection of the wale 44 and the course 34 so as to form a pucker, not shown, but this presents no problem because it is to be cut out and disposed of.

At this point the courses 36', 38' and 40' are knit in sequence with the yarn being cut just after wale 56, and the knitting is resumed on the other side of the section 12. A course 34" is then knit as usual to the course 40' until it reaches the wale 56 at which point it is knit to the course 34' at a wale 58 as indicated by an arrow 60. Inasmuch as the knitting of yarn connected to courses 34''' and 34'''' corresponds to the knitting just described, there seems to be no need to explain it in detail. Puckers are formed when yarn from the courses 34', 34", 34 ''' and 34'''' are first knit to the previous one so that the upper edge of the section 12 is uneven when it does not run along a course. The lower edge will be even, however.

Figure 5:
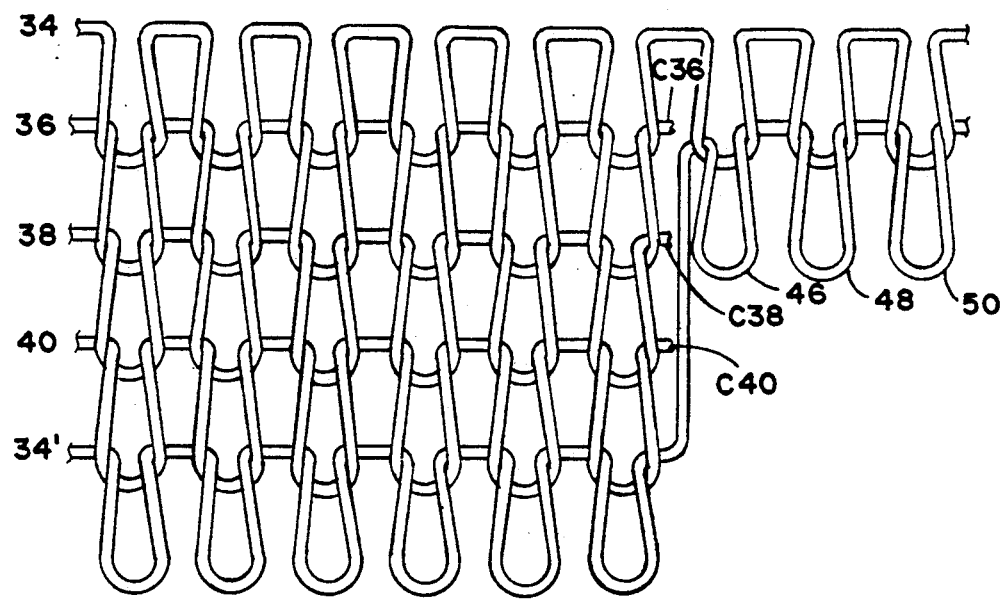

FIG. 5 shows the actual yarn when yarn from the course 34' is knit to the course 34 at the wale 44 by the stitch at 46.

From the above description, it can be seen that a circular knitting machine can be operated continuously to form the blank of this invention. It knits course after course as usual except that during portions of courses lying within the sections 12, it knits only during selected courses that are separated by other courses. Every fourth course was selected in the example described above, but any combination can be used as long as some courses are omitted.

As a non-preferred variation, needles for the wales of a course part way down and within the section 12 can be pressed off and normal knitting carried out in the wales on either side from that point on.

What is claimed is:

1. A garment blank comprising:
   (a) a knit tubular body having a bottom course;
   (i) a first section of said body having stitches that are knit with yarn in courses connected to vertically adjacent courses;
   (ii) second sections of said body disposed on opposite sides thereof that are knit with yarn in courses laterally continuing from selected spaced courses of said first section and each said selected spaced course in each said second section looped through another said selected spaced course; and
   (b) a rear panel knit on said body along a portion of said bottom course that is equidistant from said second sections.

2. A tubular blank as set forth in claim 1 wherein:
   said first section is knit by a circular knitting machine with yarn from a given number of yarn feeders, and
   said second sections are knit by said circular knitting machine with yarn from a number of yarn feeders that is less than said given number.

3. A blank for use in the manufacture of a brief or panty comprising:
   (a) a tubular knit body having pressed of stitches around more than 180° of its lower periphery and a knit panel extending from the remainder of the periphery.
   (b) sections within said tubular body on either side of said panel that are to be included in material to be cut away and disposed of so as to form leg openings, and
   (c) said sections being knit with yarn from courses in said tubular body, at least some of which are spaced from one another.

4. A blank as set forth in claim 3, further comprising:
   (a) a knit guide line for cutting formed in said tubular blank that respectively surround said sections.

5. A garment blank as set forth in claim 3 wherein said sections are knit with yarn from selected courses in said tubular body, at least some of which are spaced from one another, and connected vertically to selected courses in said tubular body, at least some of which are spaced from one another.

6. A method of manufacturing a brief or panty from a garment blank comprising the steps of:
   (A) providing a garment blank comprising:
      (a) a knit tubular body having a bottom course, a first section of said body having stitches that are knit with yarn in courses connected by wales to adjacent courses, and second sections of said body disposed on opposite sides thereof being knit with yarn in courses laterally continuing from selected spaced courses of said first section and each of said selected spaced courses in each said second section looped through another said selected spaced course, and (b) a rear panel knit on said body along a portion of said bottom course that is equidistant from said second sections;

(B) cutting an upper portion of a leg opening around each of said second sections; and (C) sewing a crotch piece at one end to said rear panel and at the other end to said tubular body.

7. A method of manufacturing a brief or panty comprising the steps of:

(A) providing a garment blank comprising a tubular knit body having pressed off stitches around more than 180° of its lower periphery and a knit panel extending from the remainder of the periphery, sections within said tubular body on either side of said panel that are to be included in material to be cut away and disposed of so as to form leg openings, said sections being knit with yarn from courses in said tubular body, at least some of which are spaced from one another;

(B) cutting said blank to remove said material to be cut away and form leg openings; and (C) sewing a crotch piece at one end to said tubular body and at the other end to said panel.

8. A tubular knit blank for use in manufacturing a garment comprising:

(A) a first section knit of stitches to be used in the garment, said first section including selected courses of yarn spaced apart by non-selected courses of yarn, and further including a bottom course of yarn; and (B) second disposable sections knit with yarn laterally connected to yarn in said selected courses of said first section;

the yarn of said non-selected courses of said first section being cut adjacent the junction of said first and second sections so as to be absent from said second sections; and (C) a single panel knit on said first section along a portion of said bottom course at a location between said second sections.

9. A tubular blank as set forth in claim 8 wherein: said second sections are knit with yarn from said selected courses of said first section.

10. A tubular blank as set forth in claim 8 wherein said selected courses of said first section are uniformly spaced apart.

11. A tubular blank as set forth in claim 8 wherein said single panel is generally rectangular in plan.

12. A method of making a blank to be used in the manufacture of a garment comprising the steps of:

(A) knitting the courses lying within a first section of a tubular blank in adjacent courses with yarn from yarn feeders;

(B) knitting intermediate courses lying in second sections of said tubular blank that are to be in the locations of the leg openings with yarn from the same yarn feeders used to feed selected spaced courses lying within said first section;

(C) knitting a single panel along a portion of the bottom course of said first section at a location between said second sections; and (D) cutting off yarn from courses lying within said first section other than said selected spaced courses adjacent junctions of said first and second sections.

13. A method of making a blank as set forth in claim 12 wherein said courses lying within said first section other than said selected spaced courses are disposed intermediate said selected spaced courses.

14. A method of making a blank as set forth in claim 12 wherein said first section is knit by a circular knitting machine with yarn from a given number of yarn feeders, and said second sections are knit by said circular knitting machines with yarn from a number of yarn feeders less than said given number.

15. A method of making a blank as set forth in claim 12 wherein said single panel is generally rectangular in plan.

* * * * *